C. W. VAUGHAN.
BRAKE PIPE CONNECTION.
No. 11,673. Reissued June 28, 1898.
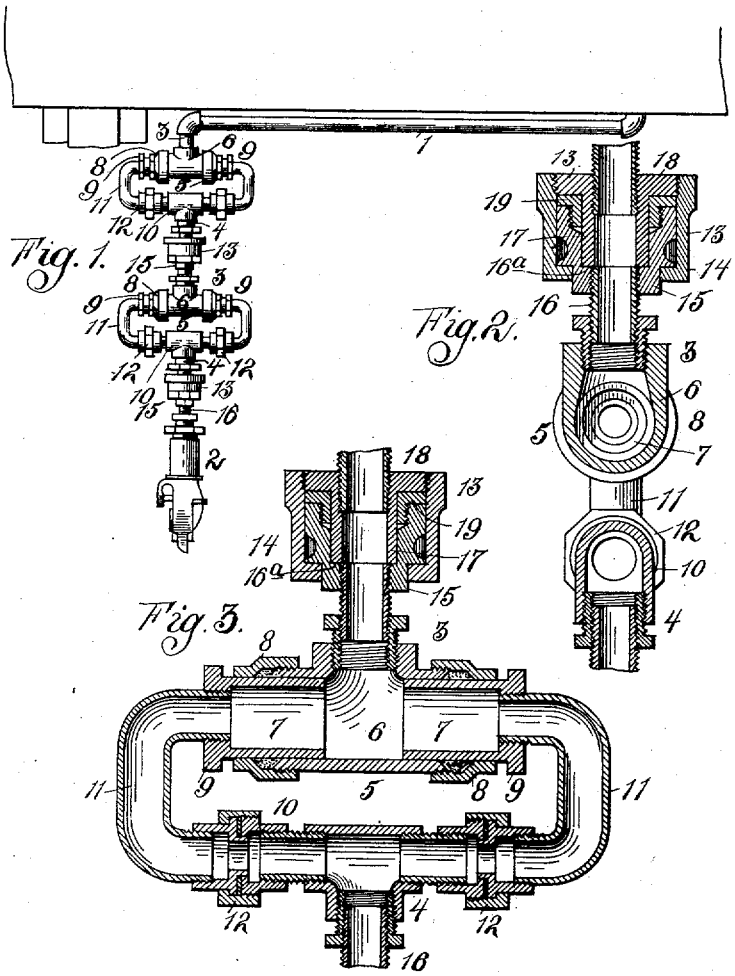
Witnesses:
Otto F. Barthel
A. L. Kolby
Inventor:
Charles W. Vaughan,
By
Wm. H. Magee & Son
Attys.
THE NORRIS PETERS CO., PHOTO-LITHO., WASHINGTON, D. C.

UNITED STATES PATENT OFFICE.

CHARLES W. VAUGHAN, OF HILLSDALE, MICHIGAN, ASSIGNOR OF ONE-FOURTH TO JOHN R. SUTTON, OF SAME PLACE.

BRAKE-PIPE CONNECTION.

SPECIFICATION forming part of Reissued Letters Patent No. 11,673, dated June 28, 1898.

Original No. 597,040, dated January 11, 1898. Application for reissue filed May 5, 1898. Serial No. 679,871.

*To all whom it may concern:*

Be it known that I, CHARLES W. VAUGHAN, a citizen of the United States, residing at Hillsdale, in the county of Hillsdale and State of Michigan, have invented a new and useful Brake-Pipe Connection, of which the following is a specification.

My invention relates to a connection for railway-brake pipes designed for conveying fluids either under compression or when subjected to the action of a partial vacuum; and the object in view is to provide a flexible metallic connection to avoid the use of hose or other equivalent means, the objection to the use of hose being the liability of bursting. By constructing the connection of a material which will not deteriorate in use and is not collapsible it is obvious that it can be used with safety in connection with either of the several forms of brake systems in common use.

Further objects and advantages of this invention will appear in the following description, and the novel features thereof will be particularly pointed out in the appended claims.

In the drawings, Figure 1 is a plan view of a connection constructed in accordance with my invention applied in the operative position to a car. Fig. 2 is a longitudinal section of the same. Fig. 3 is a sectional plan view of one link connection, showing the longitudinal and transverse swivels.

Similar numerals of reference indicate corresponding parts in all the figures of the drawings.

The connection embodying my invention comprises separable members adapted to be carried, respectively, on different cars and having communication with the train-pipes or other pressure-conveyers 1 thereof, said pipes or other pressure-conveyers being terminally arranged contiguous to the draw-heads by which the cars are coupled. The free ends of these connection members embodying my invention are provided with suitable coupling members 2, which, however, form no part of my invention and may be of any suitable or preferred construction.

Each member of the connection comprises a plurality of links corresponding in construction and being variable as to number to suit the required length of the connection. In the construction illustrated two of these links are shown, each comprising link members 3 and 4, of tubular construction, which are longitudinally disposed and are connected by an axially-transverse swivel-joint 5, so arranged as to allow transverse or lateral relative movement of the link members. In the construction illustrated the link member 3 terminates in a transverse barrel or sleeve 6, in the extremities of which are fitted thimbles 7 for rotary movement, stuffing-boxes 8 being fitted upon the extremities of the barrel or sleeve to receive the thimbles and prevent reduction of pressure at the joints. Said thimbles are also preferably provided with collars 9.

The link member 4 is provided with transverse branches 10, and the thimbles are provided with double elbows 11, of which the free arms are alined with the branches of the link member 4, unions 12 being employed to detachably connect said arms, which are carried, respectively, by the thimbles, with the branches of the link member 4, and it is obvious that by detaching said parts at the unions the thimbles may be withdrawn from the barrel or sleeve of the link member 3 for the purpose of renewing the contents of the stuffing or for other repair. The link member 4 also terminates at the other end in an axially-longitudinal swivel 13, consisting of a longitudinal barrel or sleeve 14, in which is fitted a thimble 15, carried by the link member 3 of the adjoining member of the connection or of a stem 16, to which is secured the coupling member 2. This thimble is shouldered, as at $16^a$, to form a bearing for the lower end of a sleeve 17, having an enlargement 18, which is threaded in the barrel 14, said sleeve fitting in the bore of the thimble and the latter being provided with a packing-nut 19.

The above-described construction provides both rotary and transverse flexibility, and thus allows the connection to yield freely to suit the strains to which it is subjected incident to the movement of the connected cars.

Various changes in the form, proportion, and the minor details of construction may be resorted to without departing from the spirit or sacrificing any of the advantages of this invention.

What I claim as my invention is—

1. A connection for fluid-pressure brake-pipes, having a plurality of longitudinal link members connected at their contiguous ends by an interposed axially-transverse swivel, and also having other longitudinal link members respectively connected with the first-named longitudinal link members by axially-longitudinal swivels, one of the terminal longitudinal link members being provided with a coupling member for engagement with a corresponding coupling member of a coöperating connection, substantially as described.

2. A connection for fluid-pressure brake-pipes, having a plurality of links connected at their adjoining ends by an axially-longitudinal swivel, each link having longitudinal tubular members connected by an axially-transverse swivel, substantially as specified.

3. A connection for railway fluid-pressure pipes comprising a plurality of links connected at their ends by an axially-longitudinal swivel, each link having longitudinal tubular members connected by an axially-transverse swivel, and a terminal coupling member (for engagement with a complementary coupler member on a coöperating connection) said coupler member being connected to a link member in such a way as to permit a rotary movement of the coupler around its axis.

4. A connection for fluid-pressure brake-pipes, comprising a plurality of links having longitudinal tubular link members, one of which is provided with an axially-transverse barrel or sleeve 6, thimbles, 7, fitted for rotary and axial movement in said barrel or sleeve, and the other link member being provided with branches detachably connected by unions with said thimbles whereby the latter may be dismounted axially and said second link member terminating in an axially-longitudinal swivel and a coupler connected to said swivel.

5. A connection for fluid-pressure brake-pipes, comprising a plurality of links connected by a longitudinal swivel, each link including a transverse swivel, and a coupler at the end of the connection.

6. A connection for fluid-pressure brake-pipes, comprising swivels, each of which comprises a barrel 14 carried by one of the connecting members, a thimble 15 in said barrel and carried by the other connecting member, the thimble being shouldered to engage a partly-closed end of the barrel and being fitted with a packing-nut and a sleeve fitted in the bore of the thimble terminally in contact with the shoulder of the same and having an enlargement to close the opposite end of the barrel to form the connection between the barrel and the member by which it is carried, substantially as described.

7. In a metallic pipe connection, the combination of link members joined together by swivel-joints, there being two transverse swivels and two longitudinal swivels, the longitudinal swivels being in the line of the length of the pipe, the section being provided at its end with a coupler.

In testimony whereof I sign the same in the presence of two witnesses.

CHARLES W. VAUGHAN.

Witnesses:
JAMES WHITTEMORE,
M. B. O'DOGHERTY.